(12) United States Patent
Kurita et al.

(10) Patent No.: US 9,726,281 B2
(45) Date of Patent: Aug. 8, 2017

(54) RANGE SWITCHING APPARATUS

(71) Applicant: Mitsubishi Electric Corporation, Tokyo (JP)

(72) Inventors: Kazuhisa Kurita, Tokyo (JP); Takuya Uryu, Tokyo (JP); Chiaki Sugano, Tokyo (JP); Masayuki Aota, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 149 days.

(21) Appl. No.: 14/637,572

(22) Filed: Mar. 4, 2015

(65) Prior Publication Data

US 2016/0131252 A1 May 12, 2016

(30) Foreign Application Priority Data

Nov. 6, 2014 (JP) .................. 2014-225737

(51) Int. Cl.
| | | |
|---|---|---|
| *F16H 61/32* | (2006.01) | |
| *F16H 57/04* | (2010.01) | |
| *F16H 57/08* | (2006.01) | |
| *F16H 1/28* | (2006.01) | |
| *F16H 61/28* | (2006.01) | |

(52) U.S. Cl.
CPC .......... *F16H 61/32* (2013.01); *F16H 57/0486* (2013.01); *F16H 57/082* (2013.01); *F16H 1/28* (2013.01); *F16H 2061/2892* (2013.01); *F16H 2061/326* (2013.01)

(58) Field of Classification Search
CPC ................ F16H 61/32; F16H 61/0006; F16H 2061/2892; F16H 2061/326; F16H 57/082; F16H 57/0486; F16H 1/28
See application file for complete search history.

(56) References Cited

U.S. PATENT DOCUMENTS

| | | | | |
|---|---|---|---|---|
| 5,265,572 A * | 11/1993 | Kadomukai | ............ | F02D 11/10 |
| | | | | 123/396 |
| 5,593,360 A * | 1/1997 | Ishida | ....................... | F16H 1/46 |
| | | | | 475/331 |
| 7,588,014 B2 * | 9/2009 | Tsugami | ................ | F02D 9/105 |
| | | | | 123/399 |

(Continued)

FOREIGN PATENT DOCUMENTS

| | | |
|---|---|---|
| JP | 58137648 A | 8/1983 |
| JP | 2009052748 A | 3/2009 |

(Continued)

OTHER PUBLICATIONS

Communication dated Dec. 8, 2015, from the Japanese Patent Office in counterpart application No. 2014-225737.

*Primary Examiner* — Victor MacArthur
(74) *Attorney, Agent, or Firm* — Sughrue Mion, PLLC; Richard C. Turner

(57) ABSTRACT

A compact and lightweight range switching apparatus is provided by suppressing the increase in the size of components in the range switching apparatus. The range switching apparatus includes: a motor mounted in a housing; a pinion placed on a shaft of the motor; a sector-shaped gear wheel having an opening inside which a gear engaging the pinion is formed; and an output shaft rotatably supporting the gear wheel in the housing.

9 Claims, 11 Drawing Sheets

(56) References Cited

U.S. PATENT DOCUMENTS

| | | | |
|---|---|---|---|
| 8,464,688 B2* | 6/2013 | Kurita | F02D 9/1065 123/337 |
| 8,671,910 B2* | 3/2014 | Kurita | F02D 9/1065 123/337 |
| 2002/0007691 A1* | 1/2002 | Peter | F16H 61/32 74/473.12 |
| 2005/0120998 A1* | 6/2005 | Kobayashi | B21K 25/00 123/399 |
| 2009/0205611 A1* | 8/2009 | Tsugami | F02D 9/105 123/399 |
| 2010/0116246 A1* | 5/2010 | Kurita | F02D 9/1065 123/337 |
| 2012/0291751 A1* | 11/2012 | Kurita | F02D 11/106 123/403 |
| 2013/0247868 A1* | 9/2013 | Kurita | F02D 11/10 123/319 |
| 2014/0000169 A1* | 1/2014 | Yokomori | B60J 5/00 49/349 |
| 2014/0305404 A1* | 10/2014 | Kurita | F02D 11/10 123/337 |
| 2014/0319948 A1* | 10/2014 | Nagase | H02K 5/145 310/83 |
| 2015/0285373 A1 | 10/2015 | Nagahori et al. | |

FOREIGN PATENT DOCUMENTS

| | | | |
|---|---|---|---|
| JP | 2012031902 A | 2/2012 | |
| JP | 2012-219871 A | 11/2012 | |
| JP | 2013233000 A | 11/2013 | |
| JP | 2015200347 A | 11/2015 | |
| WO | WO 2013085056 A1 * | 6/2013 | H02K 5/145 |

* cited by examiner

RANGE SWITCHING APPARATUS

BACKGROUND OF THE INVENTION

Field of the Invention

The present invention relates to a range switching apparatus including what is called a shift-by-wire system in which a driver selects a shift range, for example, by shift lever, that is set by an electric signal.

Description of the Related Art

This application is related to copending U.S. application Ser. No. 14/449,815, filed Aug. 1, 2014, commonly assigned with the present invention.

For example, as described in Patent Document 1 (the copending application), a range switching apparatus including a motor, a speed reduction mechanism and an output shaft within a shell member is known.

In the range switching apparatus described in the Patent Document 1, an electronic control unit is placed within the shell member, and a projected connector is provided on the housing body of the range switching apparatus, then a connector receiving a wire from an external unit is coupled to the connector of the housing body, thus the range switching apparatus is electrically connected to the external unit.

[Patent Document 1] U.S. Ser. No. 14/449,815 (JP-A-2014-78410)

However, the range switching apparatus described in the Patent Document 1 uses a sector-shaped external gear in a parallel shaft gear speed reduction part of the final stage of a speed reduction unit, which causes the distance between the gear shafts to increase, causing a problem of increasing the size of the range switching apparatus.

Further, the transmission side of a range switching mechanism includes a detent mechanism using a detent plate, a detent spring and the like so that fixedly positioning to individual shift ranges can be done, and also the transmission side of the range switching mechanism includes an inhibitor switch having the functions of recognizing a positioned range and turning on a positioning lamp corresponding to the individual positioned range, turning ON/OFF a power supply for other actuators, and the like. In addition to the detent mechanism and the inhibitor switch, the range switching apparatus is included, which also causes a problem of increasing the size of the overall range switching mechanism.

Further, in positioning to the individual shift ranges using the range switching apparatus, when a reverse starting torque from the output shaft of the range switching apparatus is equal to or less than a detent torque provided in the transmission, positioning to the individual shift ranges can rely on the detent torque, which facilitates positioning control of the range switching apparatus. However, in order to generate a torque needed for shift range switching by the range switching apparatus, a torque generated by a motor needs to be amplified using a speed reduction mechanism such as a gear.

However, in return for that, a reverse starting torque caused by a motor cogging torque of the range switching apparatus and a loss torque of the speed reduction mechanism increases, so this reverse starting torque exceeds the detent torque, resulting in difficulty in the control relying on the detent torque, which causes a problem of requiring high precision in controlling the range switching apparatus.

SUMMARY OF THE INVENTION

In order to solve the above problem, it is an object of the present invention to provide a compact and lightweight range switching apparatus by suppressing the increase in the size of components in the range switching apparatus.

Further, it is an object of the invention to provide a range switching apparatus in which the number of components on the transmission side can be reduced by simplifying the configuration in the range switching apparatus.

Furthermore, it is an object of the invention to provide a range switching apparatus in which high precision is not required for controlling the range switching apparatus and the control can be facilitated with a simple configuration.

A range switching apparatus in accordance with the invention includes: a motor mounted in a housing; a pinion placed on a shaft of the motor; a sector-shaped gear wheel having an opening inside which a gear engaging the pinion is formed; and an output shaft rotatably supporting the gear wheel in the housing.

Further, a range switching apparatus in accordance with the invention includes: a motor mounted inside a housing; a pinion placed on a shaft of the motor; a gear wheel engaging the pinion and having a sector shape having external teeth formed on the outer periphery thereof; and an output shaft rotatably supporting the gear wheel inside the housing, wherein the gear wheel includes a contact member on one side surface with an insulating member in between, and wherein a stationary terminal is placed on the housing at a position corresponding to the contact member.

According to the range switching apparatus in accordance with the invention, the range switching apparatus has the sector-shaped gear wheel having the opening inside which the gear engaging the pinion is formed, that is, the pinion is placed inside the opening of the gear wheel, so the center distance between the gears can be reduced, which downsizes the speed reduction mechanism, enabling downsizing of the whole of the range switching apparatus and improvement of the mountability to around the transmission.

Further, according to the range switching apparatus in accordance with the invention, the gear wheel includes the contact member on one side surface with an insulating member in between, and a stationary terminal is placed on the housing at a position opposite to the contact member, then the switching function in response to the switched range position is provided by making these members in contact with or not in contact with each other, which enables the function of the inhibitor switch that is conventionally provided to the transmission to be integrated with the range switching apparatus, thereby allowing the number of components and the number of man-hours for component assembling to be reduced in the whole vehicle.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
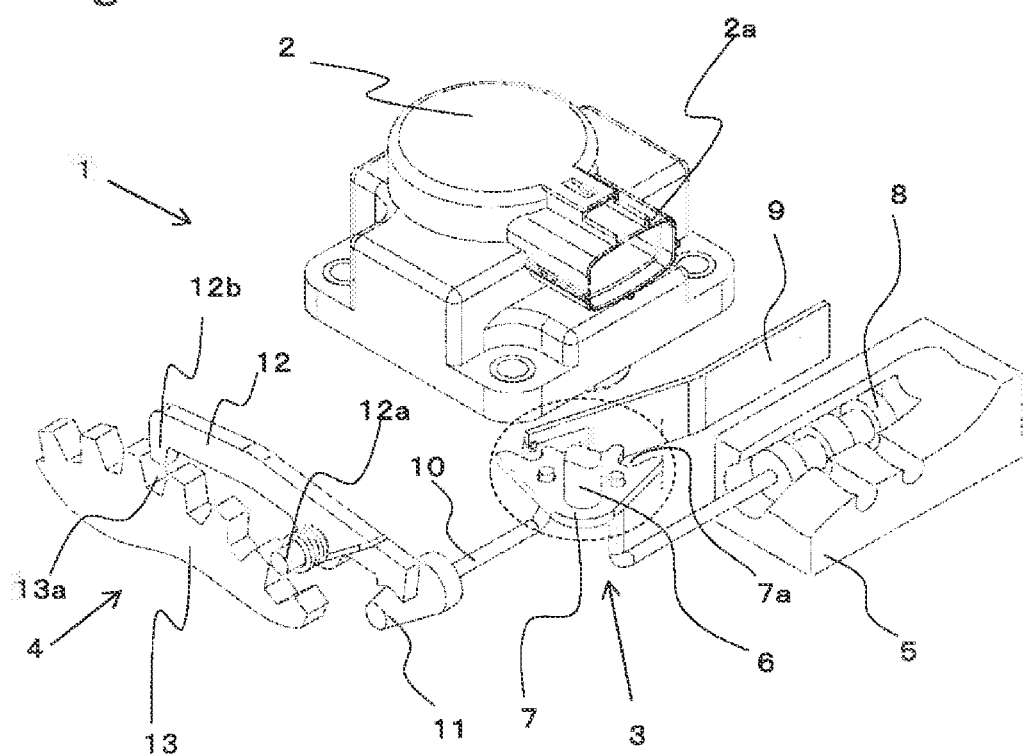
FIG. 1 is a perspective view schematically showing a range switching apparatus and its peripheral mechanism in accordance with a first embodiment of the invention.

A first embodiment of the invention is described below with reference to the drawings. Note that, through the drawings, the same or corresponding components are denoted by the same reference numerals.

FIG. 1 is a perspective view schematically showing a range switching apparatus and its peripheral mechanism in accordance with the first embodiment of the invention. As shown in FIG. 1, a range switching mechanism 1 includes a range switching apparatus 2 that is a main part of the first embodiment of the invention, a detent mechanism 3, a parking mechanism 4, and a valve body 5.

Here, the range switching apparatus 2 is configured so as to be, for example, mounted on an automatic transmission installed in a vehicle, and includes a connector 2a through which a shift signal (electric signal) from a shift lever (range selecting means) used by a driver to select a shift range is supplied. Based on this shift signal, the range switching apparatus 2 rotationally drives a shift shaft 6 that is coupled to the output shaft of the range switching apparatus 2 to be driven, to cause a generally sector-shaped detent plate 7 attached to the shift shaft 6 to move rotationally. The detent plate 7 has a spool valve 8 engaged thereto. When the detent plate 7 is caused to move rotationally by the rotational movement of the shift shaft 6, the engaged spool valve 8 reciprocally moves within the valve body 5, which causes an oil passage in the valve body 5 to be switched, setting a given shift range (P, R, N, D).

The detent plate 7 includes a plurality of concave portions 7a at the generally sector-shaped edge. The concave portions 7a correspond to the individual range positions (P, R, N, D) of the spool valve 8. Further, a detent spring 9 fixed to the valve body 5 acts as a plate spring to press its tip against the concave portions 7a, thereby positioning and holding the detent plate 7.

On the other hand, the parking mechanism 4 includes: a parking rod 10 coupled to the detent plate 7; a conical portion 11 provided on the tip of the parking rod 10; a parking pole 12; and a parking gear 13. As the detent plate 7 moves rotationally, the parking rod 10 displaces, thereby causing, through the conical portion 11 provided on the tip, the parking pole 12 to swing upward or downward about the shaft 12a. As the parking pole 12 swings in this way, a convex portion 12b of the parking pole 12 fits or leaves a concave portion 13a of the parking gear 13, which achieves locking and unlocking of the parking mechanism 4, disabling or enabling the rotation of the output member of the transmission.

As described above, in the range switching mechanism 1, since the shift shaft 6 and the spool valve 8 are interlocked with each other through the detent plate 7, controlling the rotation angle of the shift shaft 6 can control the position of the spool valve 8 and set a given shift range.

Next, the range switching apparatus 2, which is a main part of the invention, is described in detail with reference to FIGS. 2 to 4.

Figure 2:
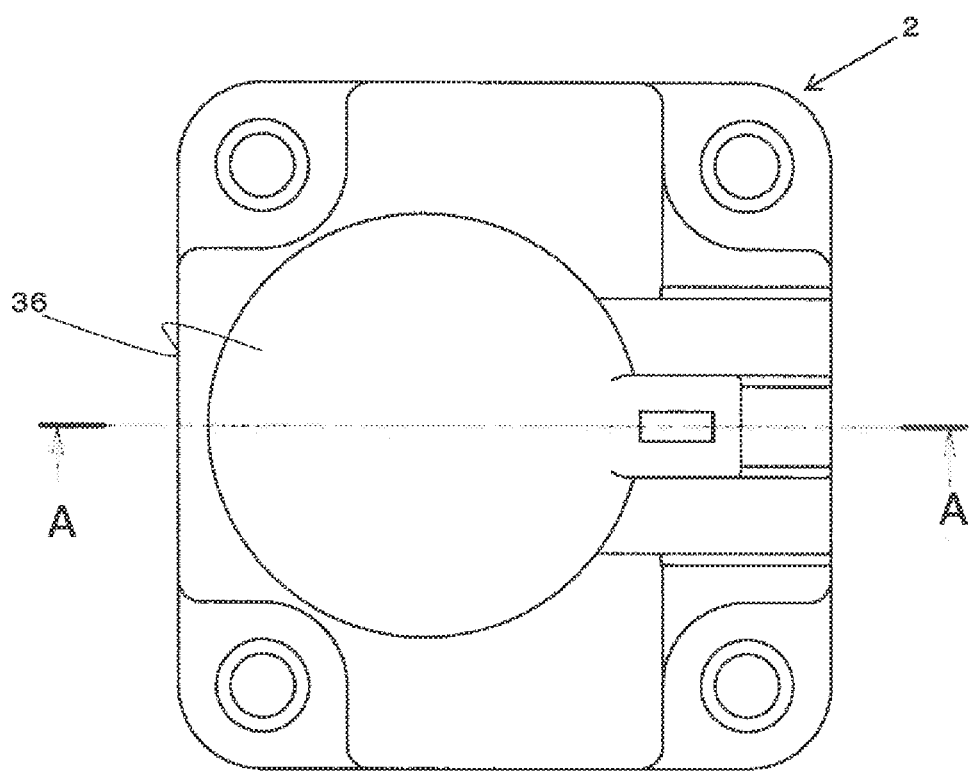
FIG. 2 is a plan view showing an appearance of the range switching apparatus in accordance with the first embodiment of the invention.

FIG. 2 is a plan view showing an appearance of the range switching apparatus of the first embodiment of the invention. FIG. 3 is a main part cross-sectional view showing the cross section along the line A-A in FIG. 2. FIG. 4 is a schematic plan view showing the configuration of a gear speed reduction mechanism of the range switching apparatus in accordance with the first embodiment of the invention. Further, FIG. 4 is a schematic plan view showing the configuration of B-B cross-sectional portion in FIG. 3.

Figure 3:
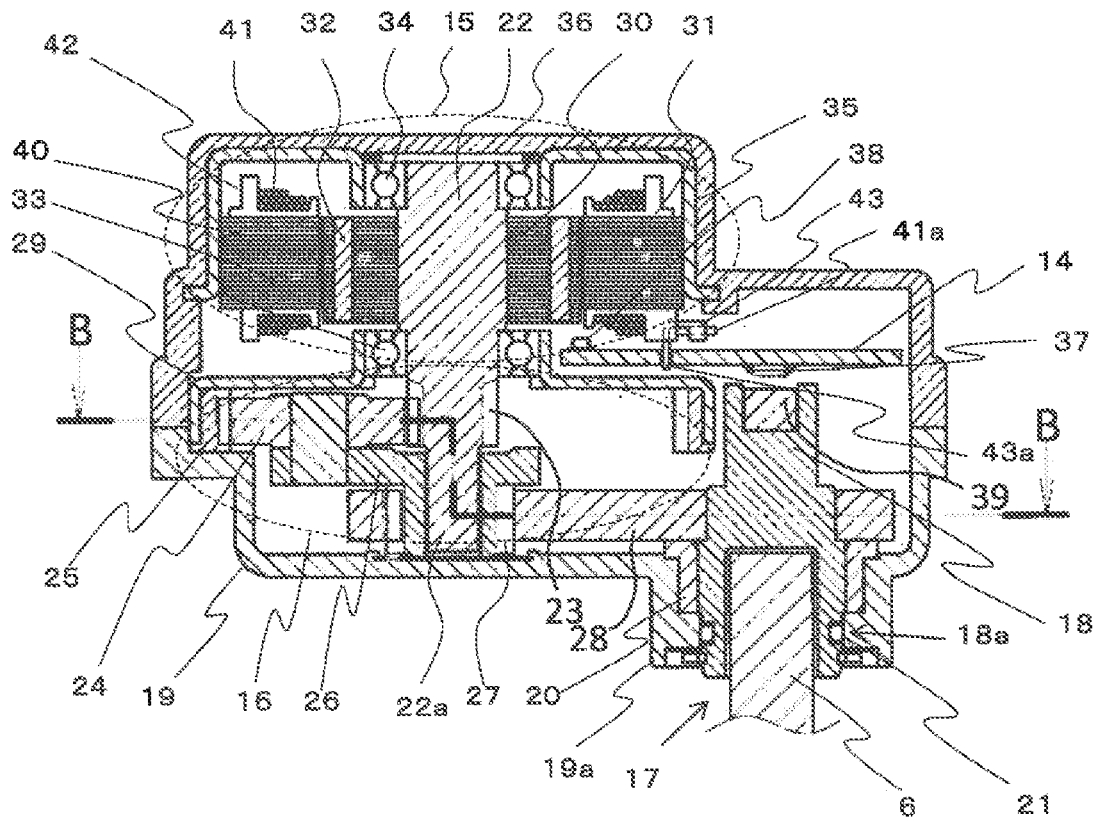
FIG. 3 is a main part cross-sectional view showing the cross section along the line A-A in FIG. 2.

In FIG. 3, the range switching apparatus 2 includes: a control board 14 for generating a control signal based on the shift signal from the shift lever; a motor 15 controlled based on the control signal from the control board 14; a speed reduction mechanism 16 coupled to the motor 15; and a range switching part 17 for switching the shift range by rotating the shift shaft 6 coupled to the speed reduction mechanism 16.

Here, an output shaft 18 of the range switching part 17 is rotatably supported by a support cylinder 19a of a front body 19 that is part of the housing of the range switching apparatus 2 with a metal bearing 20 provided inside the support cylinder 19a in between. Further, a concave portion 18a is provided on the front-side outer periphery of the output shaft 18 with a seal member 21 sandwiched by the concave portion 18a and the front body 19 maintaining air-tightness or fluid-tightness against the outside.

On the other hand, the speed reduction mechanism 16, composed of a planet gear speed reduction mechanism and a spur gear speed reduction mechanism, includes: a sun gear 23 integrally formed with a rotating motor shaft 22; a planet gear 24 engaging with the sun gear 23; an internal gear 25 engaging with the planet gear 24; a carrier 26 rotatably and orbitably supporting the planet gear 24; a pinion 27 integrally formed with the carrier 26 on the side opposite to the planet gear; and a gear wheel 28 fixed to the output shaft 18 and engaging with the pinion 27.

Note that the carrier 26 integrally formed with the pinion 27 is rotatably and slidingly supported on the outer periphery of a motor shaft tip 22a extending toward the planet gear side. Further, the internal gear 25 is formed of a resin with an insert plate 29 insert-molded.

The motor 15 is a brushless motor using a permanent magnet and includes: a rotor 30 that is rotatably supported; and a stator 31 placed coaxially with the rotation center of the rotor 30.

Note that the rotor 30 is press-fit and fixed to the motor shaft 22 with a magnet 32 fixed to inside the rotor 30 by a means such as adhesion. The motor shaft 22 is rotatably supported by a rear body 36 with a first rolling bearing 33 and a second rolling bearing 34 in between. Further, a yoke 35 is integrally formed with the rear body 36 with the stator 31 press-fit and fixed to the yoke 35. Note that the rear body 36 is combined with the front body 19 to form the housing of the range switching apparatus 2. The shaft axis of the output shaft 18 of the range switching part 17 and the shaft axis of the motor shaft 22 are placed spaced from each other to allow the pinion 27 and the gear wheel 28 to be placed.

The control board 14 is fixed to the rear body 36 with one end placed to face the output shaft 18 of the range switching part 17 and the other end placed to face the rotor 30 of the motor 15. Here, on the control board 14 at the position facing the output shaft 18, a range switching position detection sensor 37 for detecting the rotation angle of the output shaft 18 is mounted, while, on the control board 14 at the position facing the rotor 30, a motor position detection sensor 38 for detecting the rotational position of the rotor 30 is mounted. Specifically, the range switching position detection sensor 37 is placed on the control board 14 on the axis of the output shaft 18 at the position facing a magnet 39 buried in the output shaft 18, includes a magnetic flux direction detection-type magnetic sensor, and detects the rotational position from a magnetic flux change of the magnet 39 due to rotation of the output shaft 18.

On the other hand, the motor position detection sensor 38 includes a non-contact Hall sensor placed on the control board 14 at the position facing the rotor 30, and can cause the motor 15 to rotate without causing loss of synchronism by detecting a magnetic field from the magnet 32 of the rotor 30 to control the motor 15. Note that the rotor 30 has an axial dimension longer than that of the stator 31, so the rotor 30 is placed such that it extends toward the motor position detection sensor 38 side.

The stator 31 fixed to the yoke 35 includes a stator core 40 and a coil 41. The stator core 40 forms a plurality of stator teeth protruding in a radial inward direction at every 30 degrees in the circumferential direction. The coil 41 includes U phase-, V phase- and W phase-coils wound around the individual stator teeth, configuring a three-phase star connection. Here, as shown in FIGS. 3 and 4, a coil end 41a that is a board-side end of each phase of the coil 41 is fixed by fusing to a terminal 43 integrally formed with and fixed to a bobbin 42 of the stator core, the terminal 43 extending axially at a position overlapping with the control board 14, with terminal ends 43a electrically and mechanically coupled directly onto the control board 14 by soldering or the like. The neutral point of the star connection is formed by the terminal 43 integrally formed with and fixed to the bobbin 42 of the stator core 40.

In the range switching apparatus of the first embodiment configured as above, a torque generated by the motor 15 is speed-reduced by the sun gear 23, the planet gear 24, the internal gear 25 and the carrier 26 and transmitted to the pinion 27. The torque having been transmitted to the pinion 27 is speed-reduced by the gear wheel 28 engaging the pinion 27 and transmitted to the output shaft 18.

Figure 4:
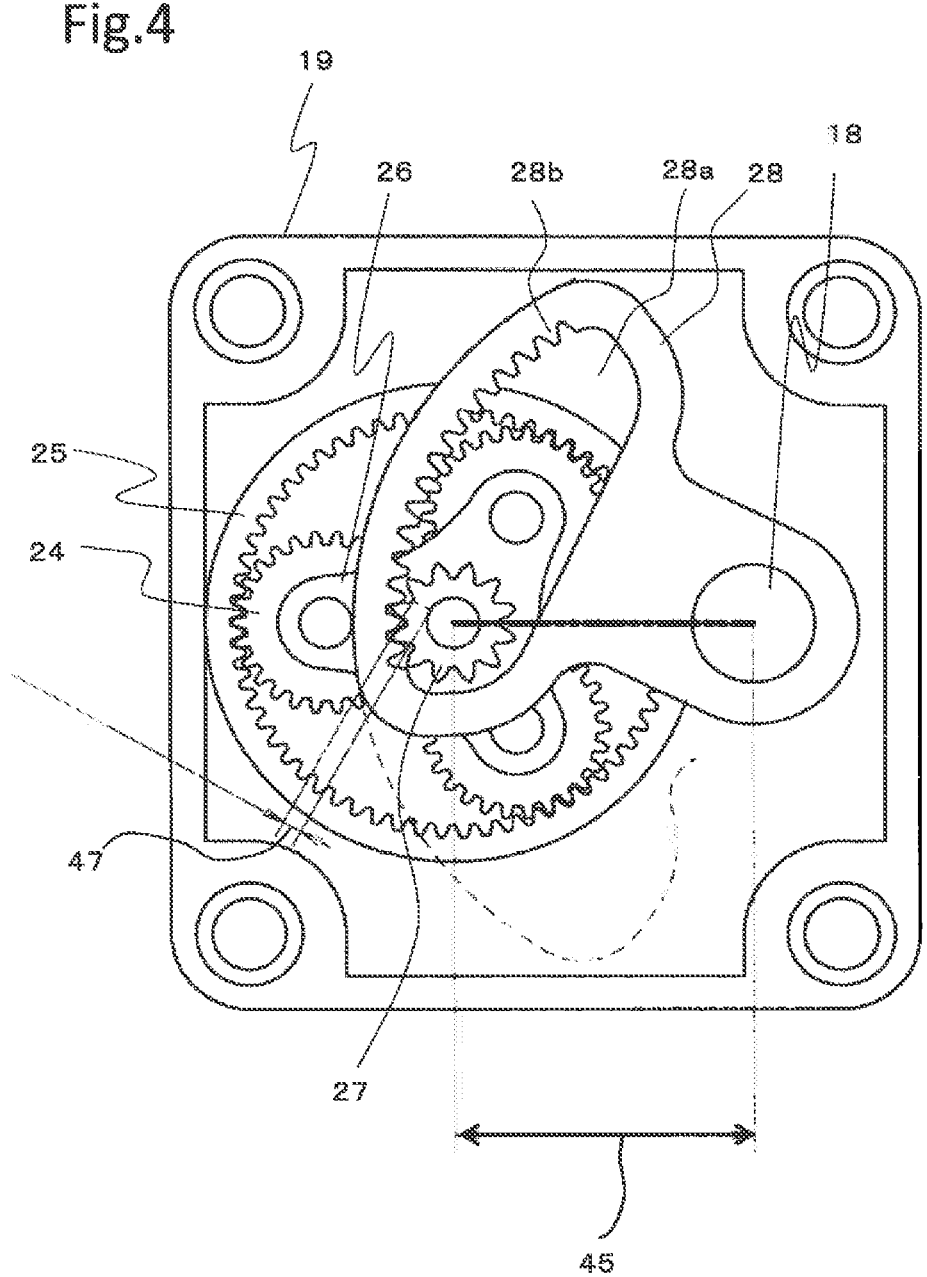
FIG. 4 is a schematic plan view showing the configuration of a gear speed reduction mechanism of the range switching apparatus in accordance with the first embodiment of the invention.

As shown in FIG. 4, with an internal gear 28b included in an opening 28a of the gear wheel 28, the pinion 27 is placed within the opening 28a of the gear wheel 28, which can reduce the center distance 45 between the gear wheel 28 and the pinion 27, allowing the parallel shaft spur gear speed reduction mechanism to be downsized. As a result, the whole of the range switching apparatus can be downsized, and also, the mountability to around the transmission can be improved.

Figure 5:
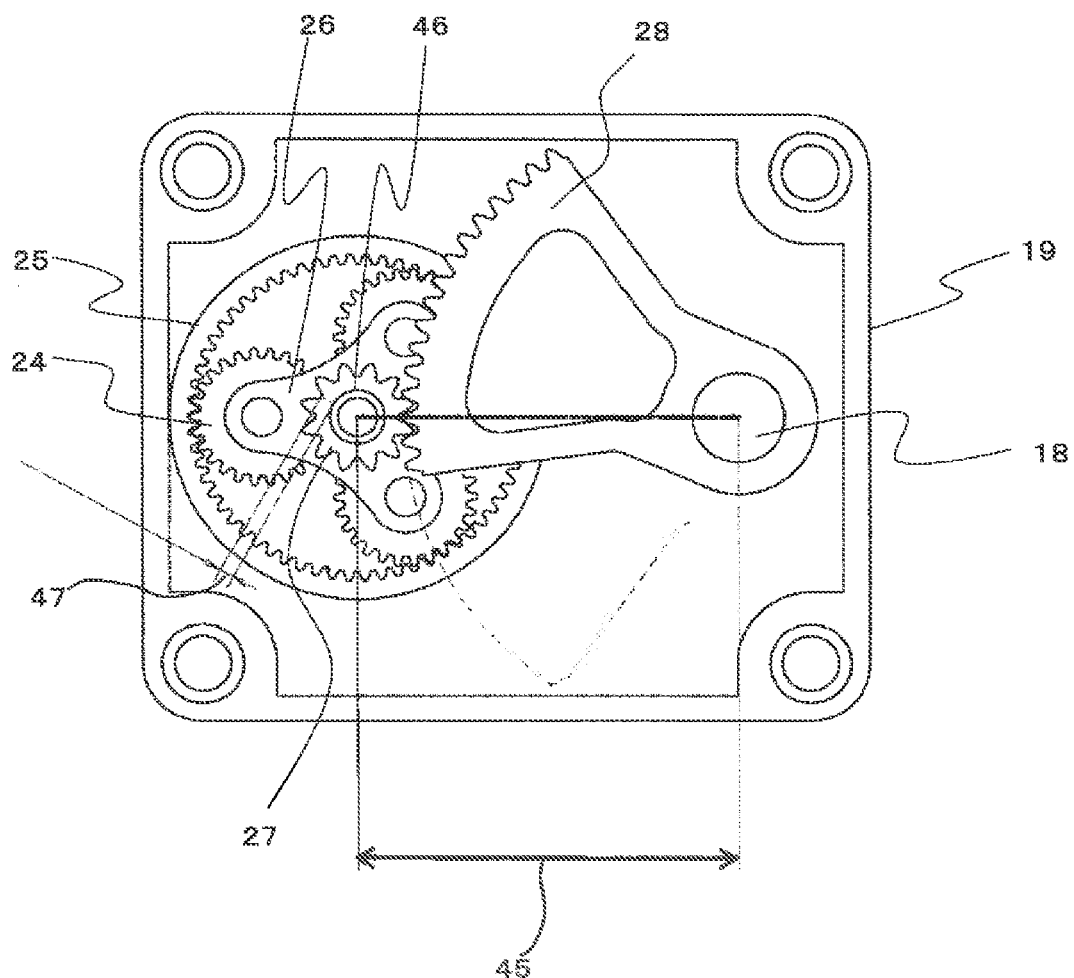
FIG. 5 is a schematic plan view showing the configuration of a gear speed reduction mechanism of a comparison example range switching apparatus in accordance with the copending application.

FIG. 5 is a schematic plan view showing the configuration of a gear speed reduction mechanism of a comparison example range switching apparatus in accordance with the copending application. As shown in FIG. 5, in the gear speed reduction mechanism of the comparison example range switching apparatus in accordance with the copending application, since a sector-shaped external gear is used as the gear wheel 28, the external teeth of the gear wheel 28 engages with the pinion 27 outside the gear wheel 28. Accordingly, the center distance 45 between the pinion 27 and the gear wheel 28 is large, which raises a problem of increasing the size of the range switching apparatus 2.

Further, in order to include the pinion 27 within the opening 28a of the gear wheel 28 having the internal gear 28b as in the first embodiment, the pinion 27 needs to be downsized. Further, the pinion 27 integrally coupled to the carrier 26 on the side opposite to the planet gear is configured to slide about the motor shaft tip 22a, so an additional member, such as a sliding bearing or the like, needs to be provided. However, with a bearing member 46 fixed within the carrier 26 by a means, such as press-fit or the like, and the wall thickness 47 of the gear root secured for press-fit, an attempt to place the pinion 27 outside the thickness 47 increases the size of the pinion 27, so it is difficult to place the pinion 27 within the opening 28a of the gear wheel 28 having the internal gear.

However, in the range switching apparatus 2 in accordance with the first embodiment of the invention, as shown in FIG. 4, the carrier 26 is formed of an oil impregnation material, such as a sintered material, which eliminates the need for placing the bearing member 46 between the pinion 27 and the motor shaft 22, enabling the number of components to be reduced. That is, the carrier can be formed of a self-lubricating material and slide directly on the shaft. Further, in addition to this, corresponding to the omission of the bearing member 46, the number of modules, teeth and the like of the pinion 27 can be reduced while securing the wall thickness 47 of the gear root. As a result, in the first embodiment, the pinion 27 can easily be included within the opening 28a of the gear wheel 28, enabling the overall apparatus to be downsized.

Second Embodiment

Figure 6:
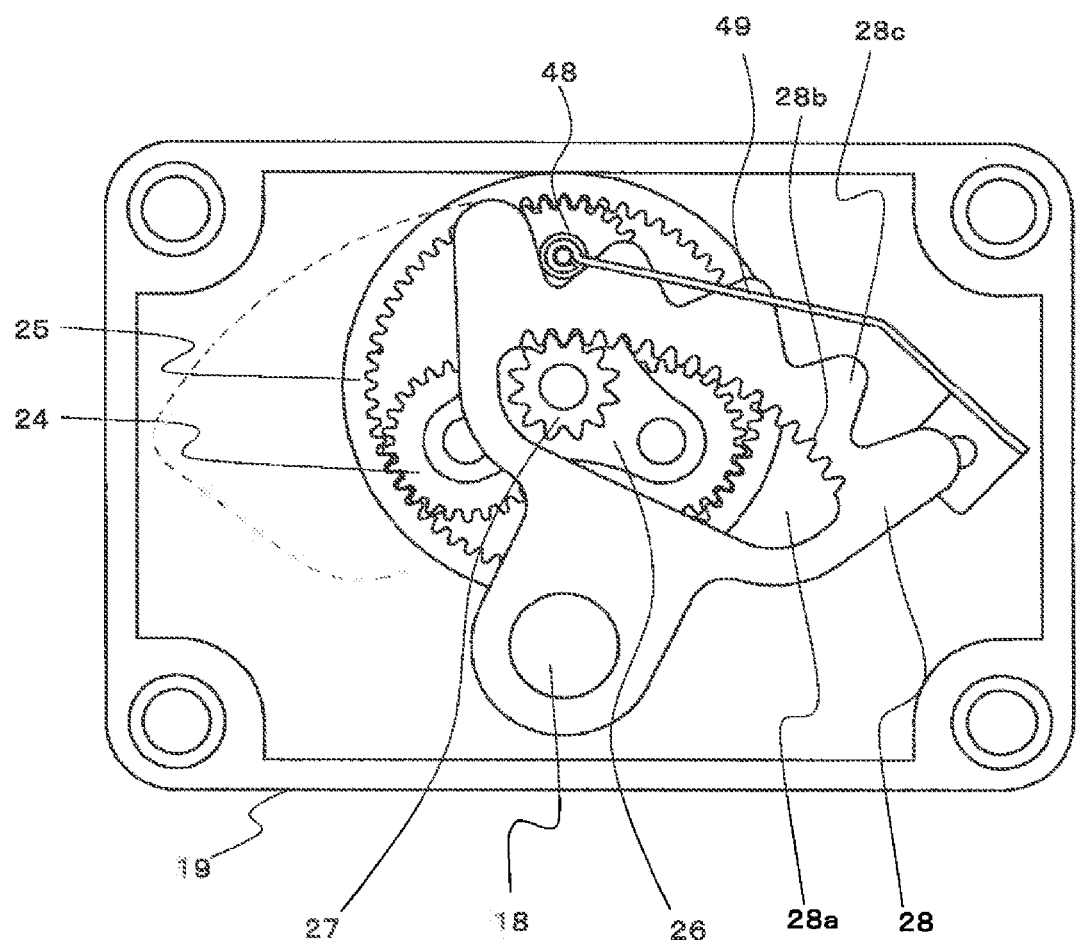
FIG. 6 is a schematic plan view showing the configuration of a gear speed reduction mechanism of a range switching apparatus in accordance with a second embodiment of the invention.

FIG. 6 is a schematic plan view showing the configuration of a gear speed reduction mechanism of a range switching apparatus in accordance with a second embodiment of the invention.

In FIG. 6, in the range switching apparatus 2, a detent spring 49 having a roller 48 at the tip is provided, and the gear wheel 28 having the internal gear 28b in the inner periphery arc portion has concave and convex portions 28c corresponding to the shift ranges formed in the outer periphery arc portion, and then, the roller 48 of the detent spring 49 is configured to engage the concave and convex portions 28c of the gear wheel 28.

In the range switching apparatus 2 of the second embodiment configured as above, the detent spring 49 is configured in the range switching apparatus 2, which eliminates the need for configuring the detent plate 7 and the detent spring 9 in the transmission, allowing the configuration of the transmission to be simplified.

Further, in the range switching apparatus 2 of the second embodiment, since the gear wheel 28 has the function of the detent plate 7, only adding the detent spring 49 to the configuration of the first embodiment enables the detent mechanism 3 to be configured in the range switching apparatus 2, allowing the number of components to be reduced in the whole including the transmission.

Third Embodiment

Figure 7:
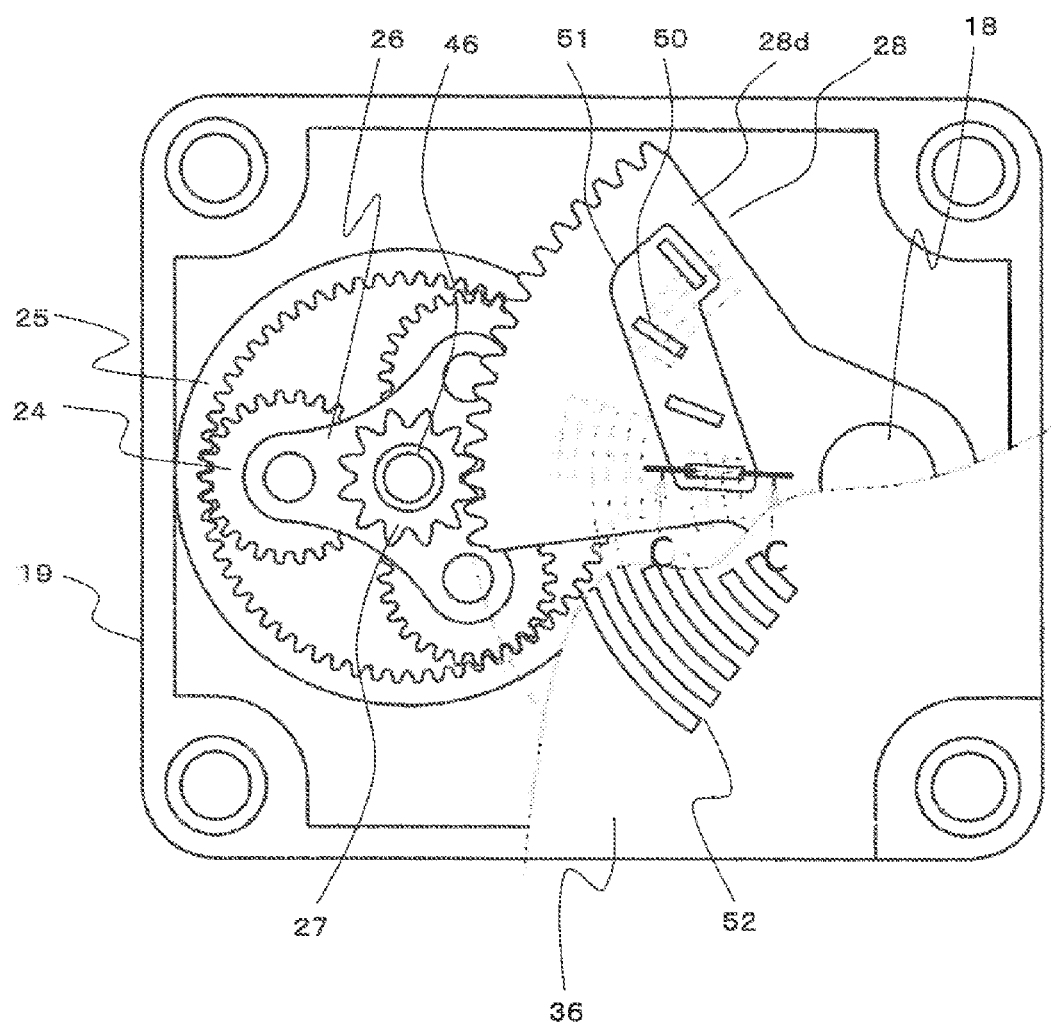
FIG. 7 is a schematic plan view showing the configuration of a gear speed reduction mechanism of a range switching apparatus in accordance with a third embodiment of the invention.
Figure 8:
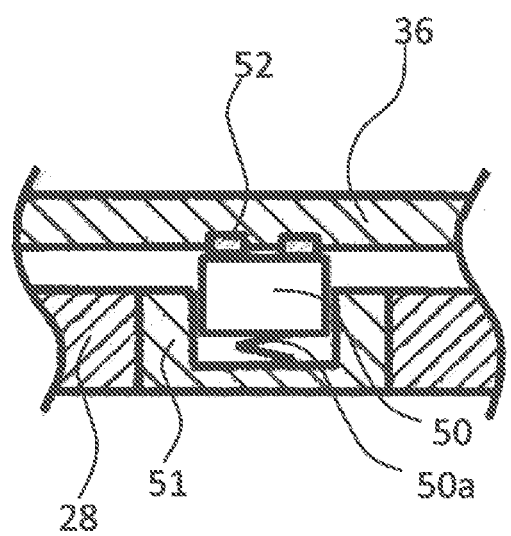
FIG. 8 is a main part cross-sectional view showing the cross section along the line C-C in FIG. 7.

FIG. 7 is a schematic plan view showing the configuration of a gear speed reduction mechanism of a range switching apparatus in accordance with a third embodiment of the invention. FIG. 8 is a main part cross-sectional view showing the cross section along the line C-C in FIG. 7. Unlike the first and second embodiments, in the third embodiment, the gear wheel 28 does not have internal teeth, but has external teeth.

In FIG. 7, the gear wheel 28 has a sector shape and includes one or more contact members 50 having a spring property on one side flat surface 28d with an insulating member 51 between the contact members 50 and the gear wheel 28. Further, in addition to this, a plurality of arc-shaped stationary terminals 52 are placed on the rear body 36 at positions opposite to the contact members 50, then the switching function in response to the switched range position is provided by making these members in contact with (electrically connected to) or not in contact with (electrically disconnected to) each other.

In the range switching apparatus 2 of the third embodiment configured as above, the function of the inhibitor switch that is provided to the transmission can be integrated with the range switching apparatus 2, which can eliminate the inhibitor switch, allowing the number of components and the number of man-hours for component assembling to be reduced in the whole vehicle.

Fourth Embodiment

Figure 9:
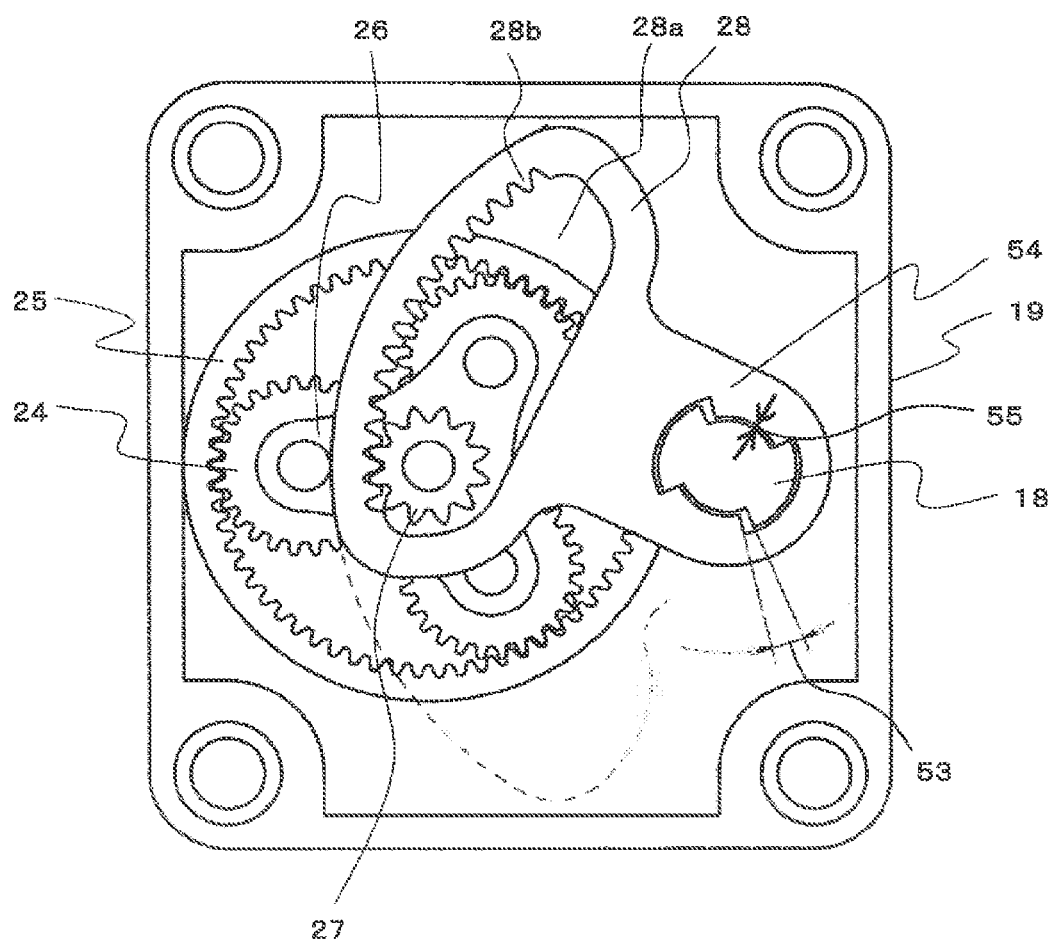
FIG. 9 is a schematic plan view showing the configuration of a gear speed reduction mechanism of a range switching apparatus in accordance with a fourth embodiment of the invention.
Figure 10:
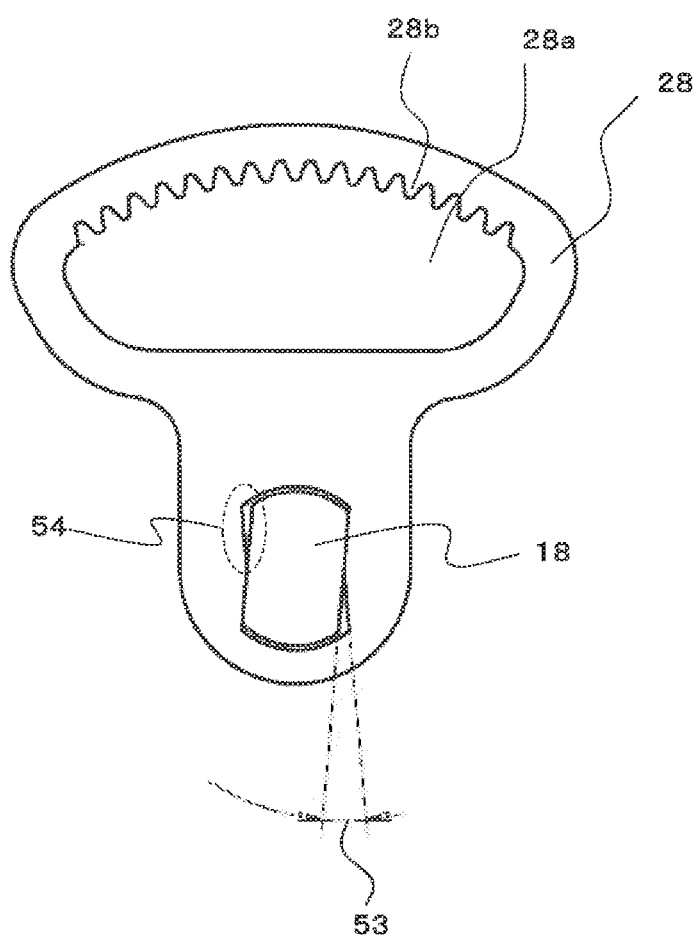
FIG. 10 is a schematic plan view showing the configuration of a fitting part of the gear speed reduction mechanism of the range switching apparatus in accordance with the fourth embodiment of the invention.
Figure 11:
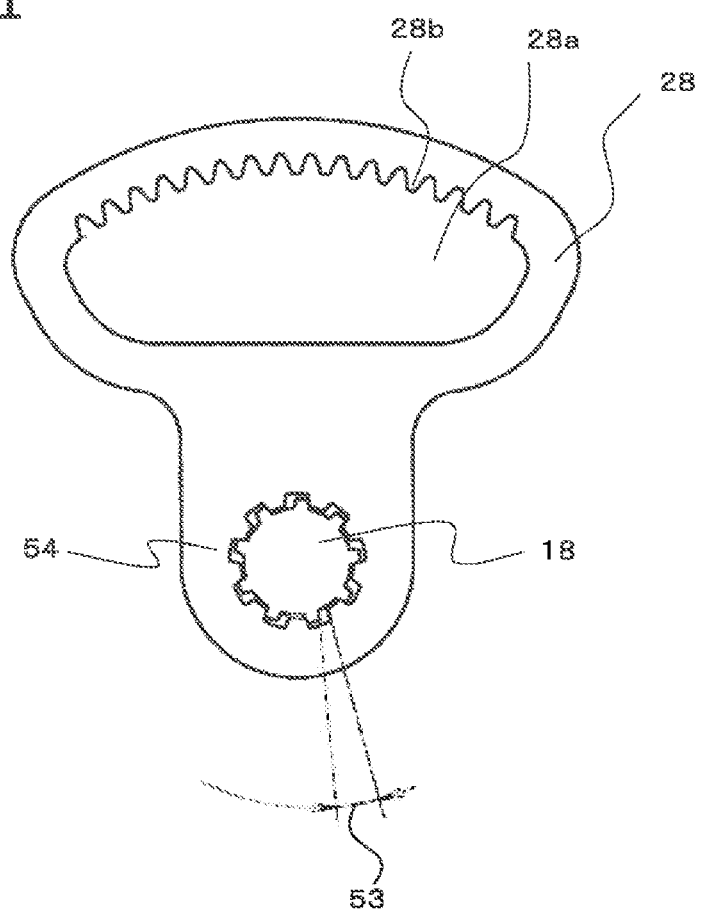
FIG. 11 is a schematic plan view showing a variation of the fitting part of the gear speed reduction mechanism of the range switching apparatus in accordance with the fourth embodiment of the invention.

FIG. 9 is a schematic plan view showing the configuration of a gear speed reduction mechanism of a range switching apparatus in accordance with a fourth embodiment of the invention. FIG. 10 is a schematic plan view showing the configuration of a fitting part of the gear speed reduction mechanism of the range switching apparatus in accordance with the fourth embodiment of the invention. FIG. 11 is a schematic plan view showing a variation of the fitting part of the gear speed reduction mechanism of the range switching apparatus in accordance with the fourth embodiment of the invention.

In FIG. 9, between the fitting parts of the outside diameter of the output shaft 18 and the inside diameter of the hole of the gear wheel 28, a gap 55 is provided in the radial direction, and also, an abutting part 54 having a certain amount of dead band 53 in the output shaft rotation direction is provided.

The range switching apparatus of the fourth embodiment configured as above enables, in positioning to the individual shift ranges, the range positioning control relying on the detent torque of the transmission without being affected by a reverse starting torque from the motor 15 and the speed reduction mechanism 16, eliminating the need for high-precision control of the range switching apparatus.

Note that the shape of the fitting part is not limited to a butterfly shape as shown in FIG. 9, but may be an H-cut shape as shown in FIG. 10 or a gear-like shape as shown in FIG. 11, and an appropriate variation or omission is possible without departing from the spirit.

As described above, between the fitting parts of the output shaft 18 and the gear wheel 28, the certain amount of dead band 53 is provided in the output shaft rotation direction, which enables, in positioning to the individual shift ranges by the range switching apparatus 2, the range positioning control relying on the detent torque of the transmission without being affected by a reverse starting torque caused by a motor cogging torque and a loss torque of the speed reduction mechanism, eliminating the need for high-precision control of the range switching apparatus.

Further, the range switching apparatus 2 of the invention is not limited to a shift range switching mechanism for vehicle, but may also be used for a driving part of various actuators for vehicle or a driving part of an industrial robot or a machine tool.

Note that according to the invention, the embodiments may be freely combined and the embodiments may be appropriately modified or omitted within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A range switching apparatus of a shift-by-wire system, the range switching apparatus comprising:
    a motor mounted in a housing;
    a pinion placed on a shaft of the motor;
    a sector-shaped gear having an opening inside in which the pinion is placed;
    an output shaft rotatably supporting the sector-shaped gear in the housing, wherein the sector-shaped gear has internal teeth directly engaging the pinion;
    a plurality of concave and convex portions provided on the outer periphery arc portion of the sector-shaped gear; and
    a detent spring having a roller at the tip,
    wherein the roller of the detent spring is formed to engage the concave and convex portions of the sector-shaped gear.

2. The range switching apparatus according to claim 1, further comprising:
    a sun gear coupled to the shaft;
    a plurality of planet gears meshed with the sun gears and placed on a circumference;
    an internal gear engaging the planet gears; and
    a carrier rotatably and orbitably supporting the planet gears,
    wherein the carrier is formed of a self-lubricating material and slides directly on the shaft.

3. The range switching apparatus according to claim 2, wherein the pinion is integrally formed with the carrier on a side opposite to the planet gear, wherein the sector-shaped gear is fixed to the output shaft, and wherein the internal gear has an insert-molded plate.

4. The range switching apparatus according to claim 1, wherein the pinion is placed inside the opening of the sector-shaped gear.

5. The range switching apparatus according to claim 1, wherein, between fitting parts of the output shaft and the sector-shaped gear, a dead band is provided in the rotation direction of the output shaft.

6. The range switching apparatus according to claim 1, wherein the sector-shaped gear has the internal teeth on an arc side thereof and the output shaft rotatable supporting the sector-shaped gear on an opposite side thereof.

7. A range switching apparatus of a shift-by-wire system comprising:
- a motor mounted inside a housing;
- a pinion placed on a shaft of the motor;
- a gear having a sector shape with external teeth formed on the outer periphery thereof to engage the pinion; and
- an output shaft rotatably supporting the gear inside the housing,
- wherein the gear comprises a contact member on one side surface with an insulating member in between, and
- wherein a stationary terminal is placed on the housing at a position opposite to the contact member such that the contact member electrically connects and disconnects from the stationary terminal.

8. The range switching apparatus according to claim 7, wherein the contact member has a spring property.

9. A range switching apparatus of a shift-by-wire system, the range switching apparatus comprising:
- a motor mounted in a housing;
- a pinion placed on a shaft of the motor;
- a sector-shaped gear having an opening inside in which the pinion is placed;
- an output shaft rotatably supporting the sector-shaped gear in the housing, wherein the sector-shaped gear has internal teeth directly engaging the pinion; and
- a seal member which is sandwich between a concave portion on a front-side outer periphery of the output shaft and a front body of the housing.

* * * * *